United States Patent
Hesslewood

(10) Patent No.: US 11,292,573 B2
(45) Date of Patent: Apr. 5, 2022

(54) FLOOR COVERING SYSTEMS IN A PASSENGER VEHICLE AND METHODS FOR INSTALLATION

(71) Applicant: The Boeing Company, Chicago, IL (US)

(72) Inventor: Sean Richard Hesslewood, Chicago, IL (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 16/386,372

(22) Filed: Apr. 17, 2019

(65) Prior Publication Data
US 2020/0331582 A1    Oct. 22, 2020

(51) Int. Cl.
*B64C 1/18*        (2006.01)
*B64F 5/10*        (2017.01)

(52) U.S. Cl.
CPC . *B64C 1/18* (2013.01); *B64F 5/10* (2017.01)

(58) Field of Classification Search
CPC .. B64C 1/18; B64F 5/10; B61D 17/10; B62D 25/2054
See application file for complete search history.

(56) References Cited

U.S. PATENT DOCUMENTS

| | | | |
|---|---|---|---|
| 2,199,938 A | 5/1940 | Kloote | |
| 7,185,466 B2* | 3/2007 | Randjelovic | E04F 15/22 52/403.1 |
| 10,836,463 B2* | 11/2020 | Mills | B64D 11/0696 |
| 10,919,612 B2* | 2/2021 | Hesslewood | E04F 15/02 |
| 2005/0193670 A1 | 9/2005 | Niese et al. | |
| 2008/0005993 A1 | 1/2008 | Su | |

(Continued)

FOREIGN PATENT DOCUMENTS

| | | |
|---|---|---|
| EP | 2889222 | 7/2015 |
| EP | 3424812 | 1/2019 |

(Continued)

OTHER PUBLICATIONS

Extended European Search Report prepared by the European Patent Office in application No. EP 20 16 8085.7 dated Sep. 14, 2020.

(Continued)

*Primary Examiner* — Benjamin P Lee
(74) *Attorney, Agent, or Firm* — McDonnell Boehnen Hulbert & Berghoff LLP

(57) ABSTRACT

An example floor covering system in a passenger vehicle is described that includes a plurality of floor covering panels positioned adjacent to each other creating interfaces between respective floor covering panels of the plurality of floor covering panels, a plurality of joint panels positioned underneath one or more of the interfaces and the plurality of floor covering panels are rigidly coupled to at least one of the plurality of joint panels to prevent relative motion between the plurality of floor covering panels, and a plurality of attachment mounts attached to a structure of the passenger vehicle. Each of the plurality of floor covering panels is coupled to one or more of the plurality of attachment mounts, and the plurality of attachment mounts enable lateral movement relative to the structure of the passenger vehicle of the plurality of floor covering panels together in a joint manner.

20 Claims, 7 Drawing Sheets

(56) References Cited

U.S. PATENT DOCUMENTS

| | | | |
|---|---|---|---|
| 2008/0209841 A1* | 9/2008 | Leopolder | E04F 15/02016 52/592.4 |
| 2011/0006562 A1* | 1/2011 | Campbell | B62D 25/2054 296/193.04 |
| 2015/0367931 A1 | 12/2015 | Cullen et al. | |
| 2018/0327075 A1* | 11/2018 | Mills | B64D 11/0696 |
| 2019/0009882 A1* | 1/2019 | Mills | B64C 1/18 |
| 2019/0276133 A1* | 9/2019 | Hesslewood | B62D 25/20 |
| 2020/0102063 A1* | 4/2020 | Jerry Koh | B64C 1/18 |
| 2020/0239121 A1* | 7/2020 | Koh | B63B 17/00 |
| 2020/0240151 A1* | 7/2020 | Koh | B64C 1/18 |
| 2020/0307759 A1* | 10/2020 | Koh | B32B 21/08 |

FOREIGN PATENT DOCUMENTS

| | | | | |
|---|---|---|---|---|
| EP | 3536603 A1 * | 9/2019 | | B64C 1/20 |
| WO | WO-2020072518 A1 * | 4/2020 | | B64C 1/18 |

OTHER PUBLICATIONS

Laminate and Hardwood Flooring, Official PERGO site, retrieved from the internet: https://na.pergo.com. on Mar. 8, 2018.

* cited by examiner

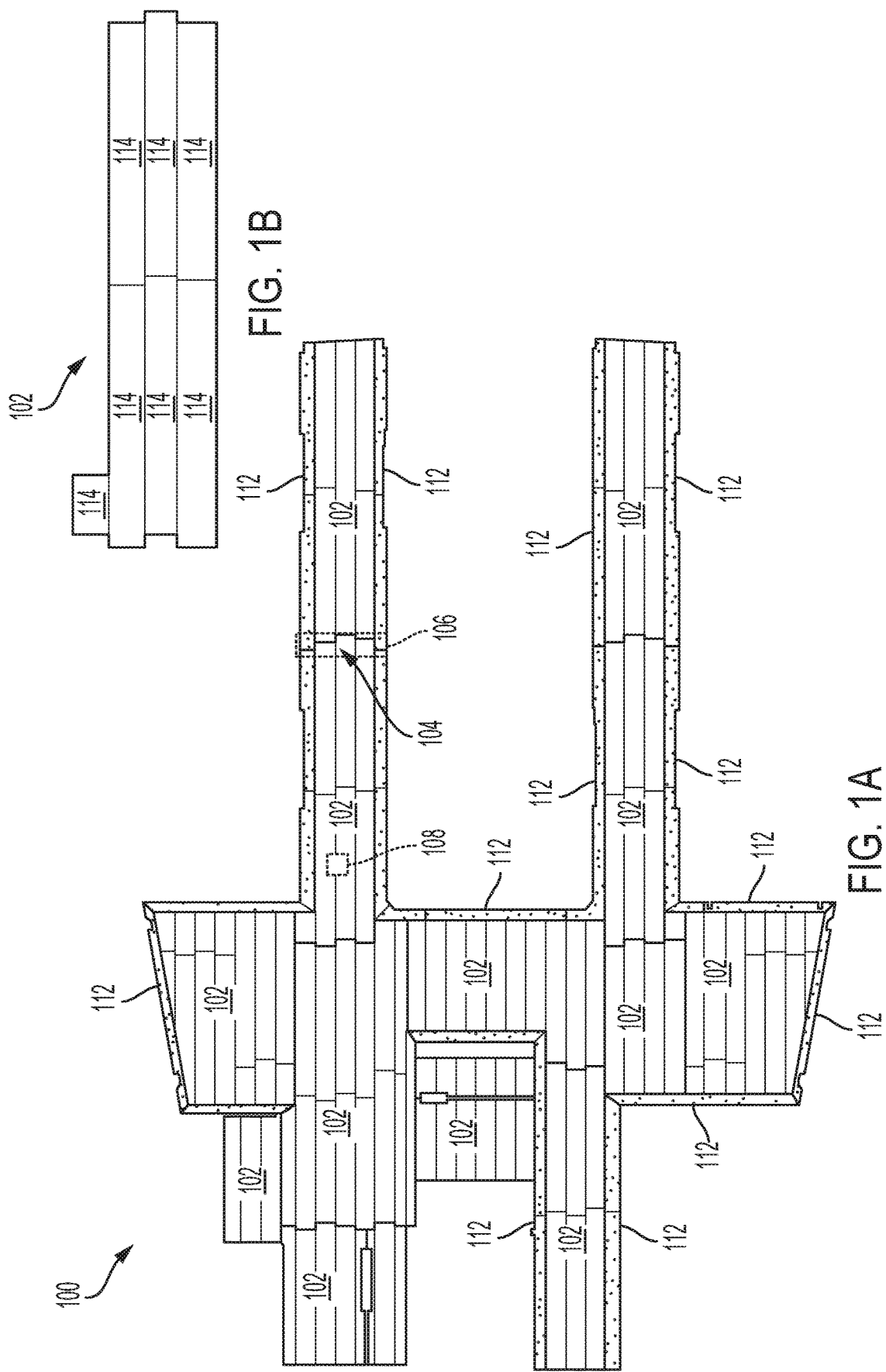

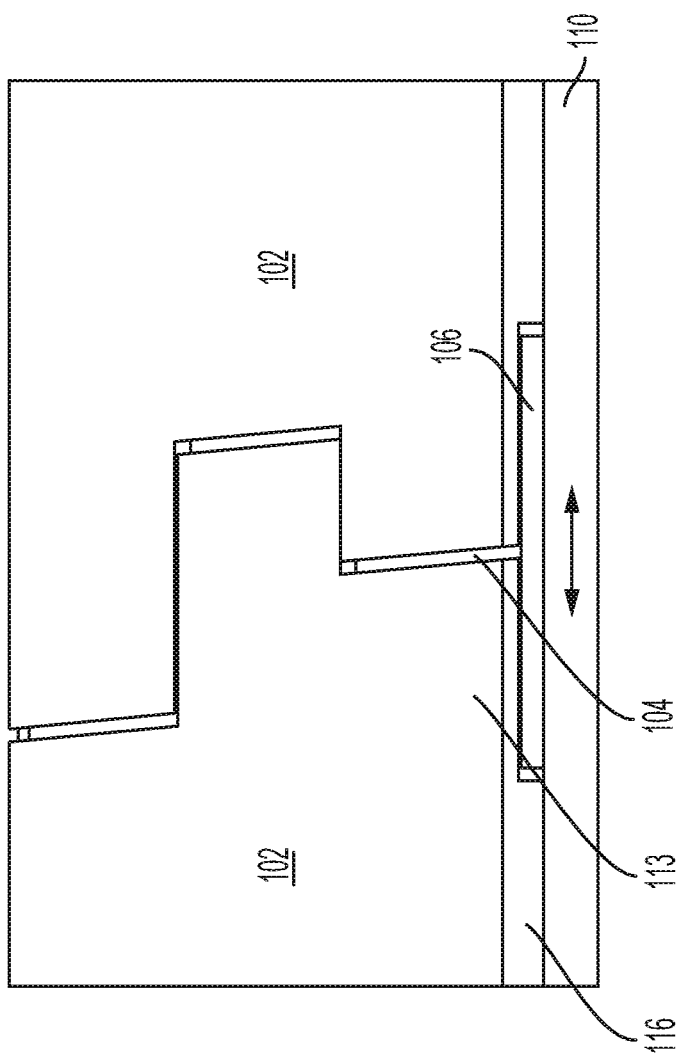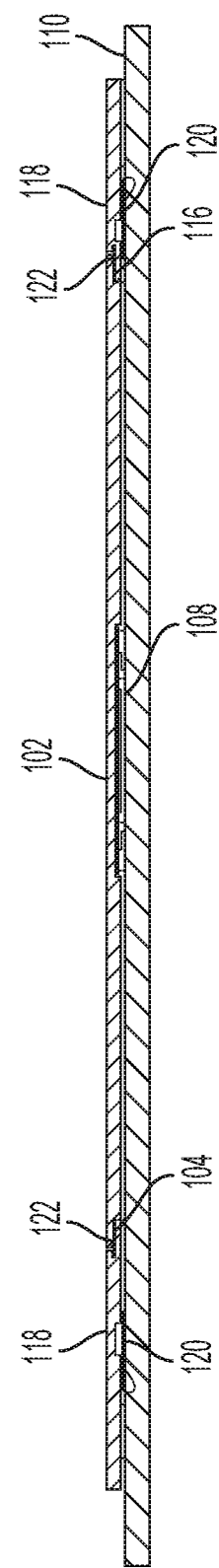

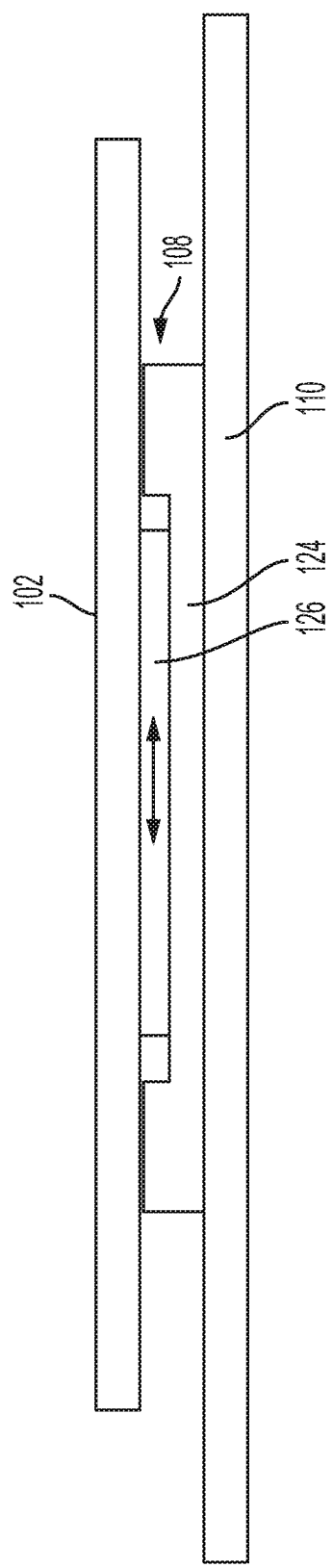

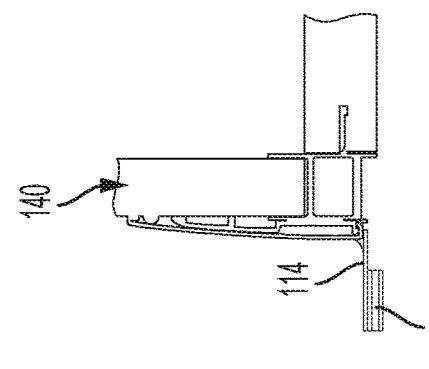
FIG. 7
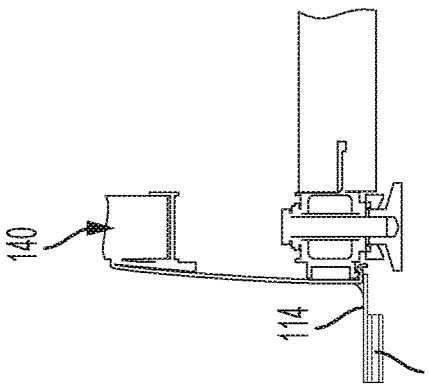
FIG. 8
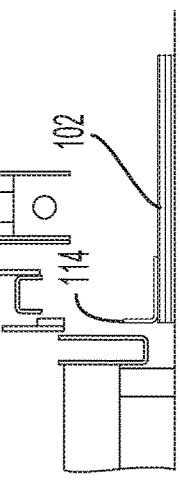
FIG. 9
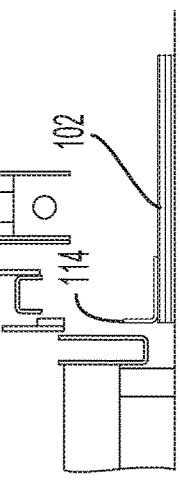
FIG. 10
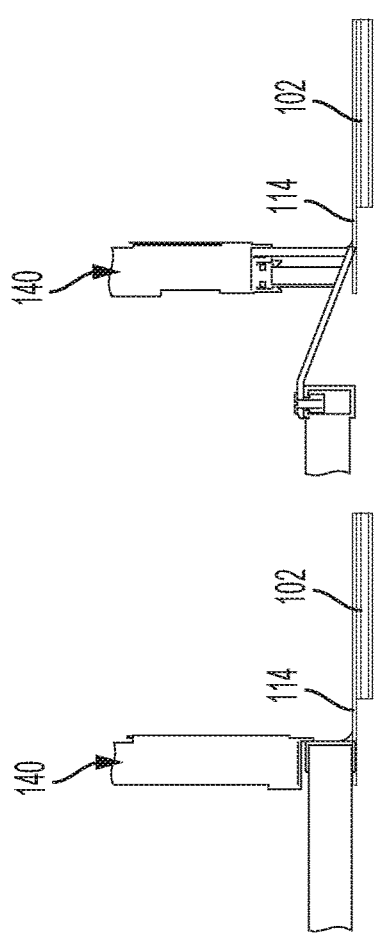
FIG. 11
FIG. 12
FIG. 13
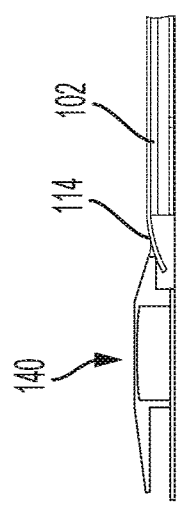
FIG. 14

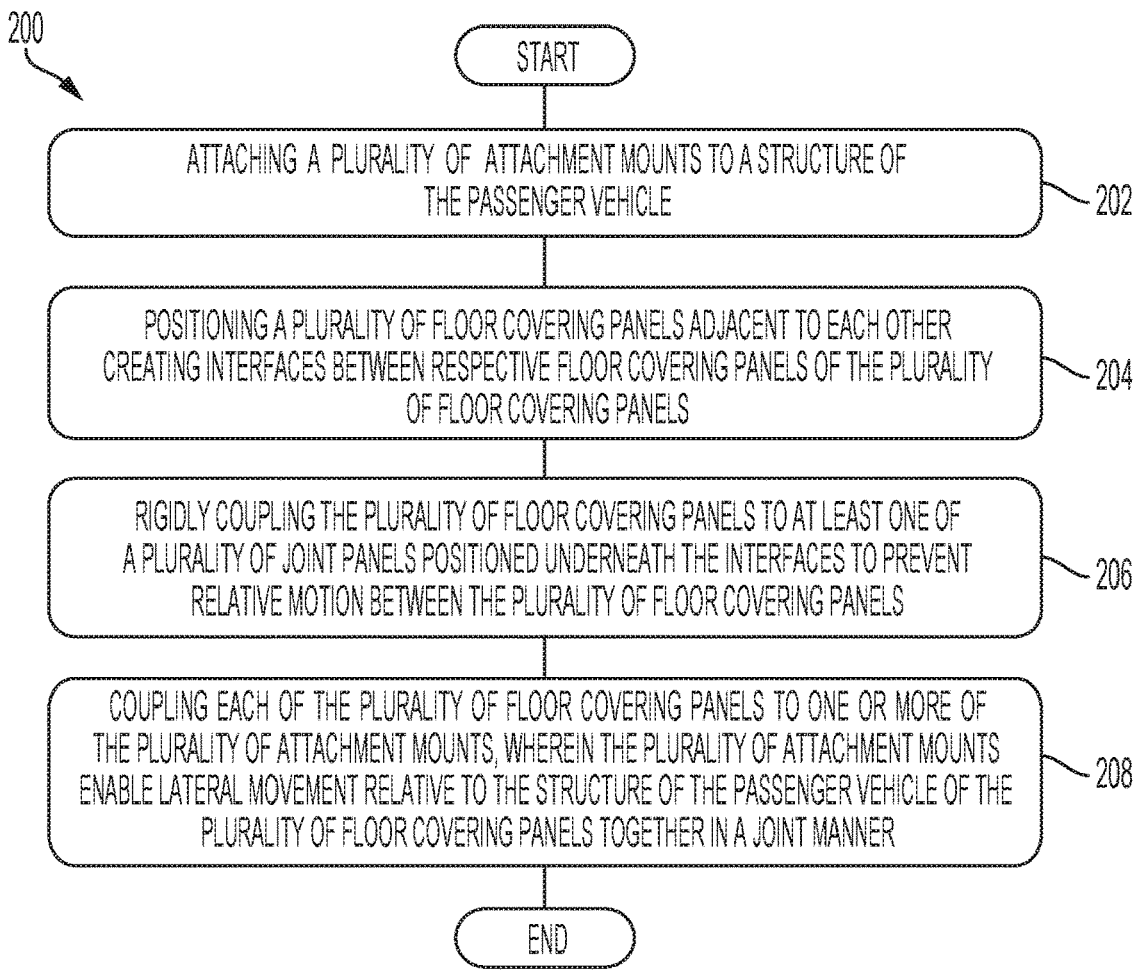

FLOOR COVERING SYSTEMS IN A PASSENGER VEHICLE AND METHODS FOR INSTALLATION

FIELD

The present disclosure generally relates to floor covering panels, and more particularly to, interlocking floor covering panels that are jointly coupled together enabling relative motion of all coupled floor covering panels to occur in a joint manner.

BACKGROUND

Cabin floors for commercial and military aircraft typically comprise a structural sub-floor with a thin laminate covering followed by a top floor covering sealed to the thin laminate covering. A moisture barrier tape can be provided along seams of the sub-floor as well.

Within this existing design, double back tape is laid down to the entire sub-floor area, to which the rigid laminate sections are laid and sealed. Then, a second layer of double back tape is laid over the laminate sections, followed by a top floor covering mat. This technique described above for forming a floor covering can be a time consuming and difficult to repeat in a production environment. In addition, replacement or repair of a single floor covering section can be difficult due to the mat typically being of a single continuous piece. The typical laminate and mat (current production) installation has also experienced issues with the mat buckling during flight.

As such, there is a need for a new floor covering system that enables a reduced installation time, provides increased reliability and repeatability of installation, and allows for improved aesthetics, increased durability, and an ability to replace individual panels.

SUMMARY

In one example, a floor covering system in a passenger vehicle is described. The floor covering system comprises a plurality of floor covering panels positioned adjacent to each other creating interfaces between respective floor covering panels of the plurality of floor covering panels, a plurality of joint panels positioned underneath one or more of the interfaces and the plurality of floor covering panels are rigidly coupled to at least one of the plurality of joint panels to prevent relative motion between the plurality of floor covering panels, and a plurality of attachment mounts attached to a structure of the passenger vehicle. Each of the plurality of floor covering panels is coupled to one or more of the plurality of attachment mounts, and the plurality of attachment mounts enable lateral movement relative to the structure of the passenger vehicle of the plurality of floor covering panels together in a joint manner.

In another example, an aircraft comprising the floor covering system is described.

In still another example, a method for installing a floor covering system in a passenger vehicle is described. The method comprises attaching a plurality of attachment mounts to a structure of the passenger vehicle, positioning a plurality of floor covering panels adjacent to each other creating interfaces between respective floor covering panels of the plurality of floor covering panels, rigidly coupling the plurality of floor covering panels to at least one of a plurality of joint panels positioned underneath the interfaces to prevent relative motion between the plurality of floor covering panels, and coupling each of the plurality of floor covering panels to one or more of the plurality of attachment mounts. The plurality of attachment mounts enable lateral movement relative to the structure of the passenger vehicle of the plurality of floor covering panels together in a joint manner.

Various examples of the system(s) and apparatus(es) described herein may include any of the components, features, and functionalities of any of the other examples of the system(s) and apparatus(es) described herein in any combination.

Various examples of the method(s) described herein may include any of the components, features, and functionalities of any of the other examples of the method(s) described herein in any combination.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 1A is a top view of an example floor covering system in a passenger vehicle, according to an example implementation.

FIG. 1B is a top view of a portion of the example floor covering system in FIG. 1A, according to an example implementation.

FIG. 2 is a side perspective view of a portion of the floor covering system, according to an example implementation.

FIG. 3 is a side view of a portion of the floor covering system, according to an example implementation.

FIG. 4 is a side view of another portion of the floor covering system, according to an example implementation.

FIGS. 7-14 illustrate example monument interfaces for the floor covering system, according to example implementations.

FIG. 15 shows a flowchart of an example method for installing the floor covering system in a passenger vehicle, according to an example implementation.

FIG. 16 shows a flowchart of an example method for use with the method shown in FIG. 15, according to an example implementation.

FIG. 17 shows a flowchart of an example method for use with the method shown in FIG. 15, according to an example implementation.

FIG. 18 shows a flowchart of an example method for use with the method shown in FIG. 15, according to an example implementation.

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples herein, components for an aircraft interior, and specifically to floor coverings, are described. There is a long felt need for hardwood or solid flooring on an aircraft, especially in some premier cabin areas. However, hardwood or solid flooring may not be practical because aircraft flooring has to be able to withstand certain vertical loads (e.g., about three times gravity), hardwood flooring is heavy causing unnecessary extra weight on the aircraft, air pockets in adhesives expand over time making a surface un-level when the aircraft is at altitude (e.g., lower pressure), hardwood flooring generally does not absorb noise as well as carpet, and spills can create a slip hazard on such flooring types.

In addition, a sub-floor on an aircraft moves making traditional hardwood or solid flooring impractical, and the motion of the sub-floor can then cause buckling of the floor covering attached to it. For example, during a flight cycle, the floor structure moves outward due to pressure differentials, and then will travel rearwards with thermal contraction as altitude changes occur. The aircraft motion is cyclic, and over time, will likely cause buckling of a traditional hardwood floor. This is due to high bond tape applied between laminate and a structural floor retaining the laminate hardwood. Thus, there exists a need for a way to provide a look and feel of hardwood flooring on an aircraft, taking these and other factors into consideration.

Referring now to the figures, FIG. 1A is a top view of an example of a floor covering system 100 in a passenger vehicle, according to an example implementation. Within examples herein, the passenger vehicle includes an aircraft (shown in FIG. 5), although the passenger vehicle can be or include or types of vehicles such as boats, trains, cars, etc.

Figure 5:
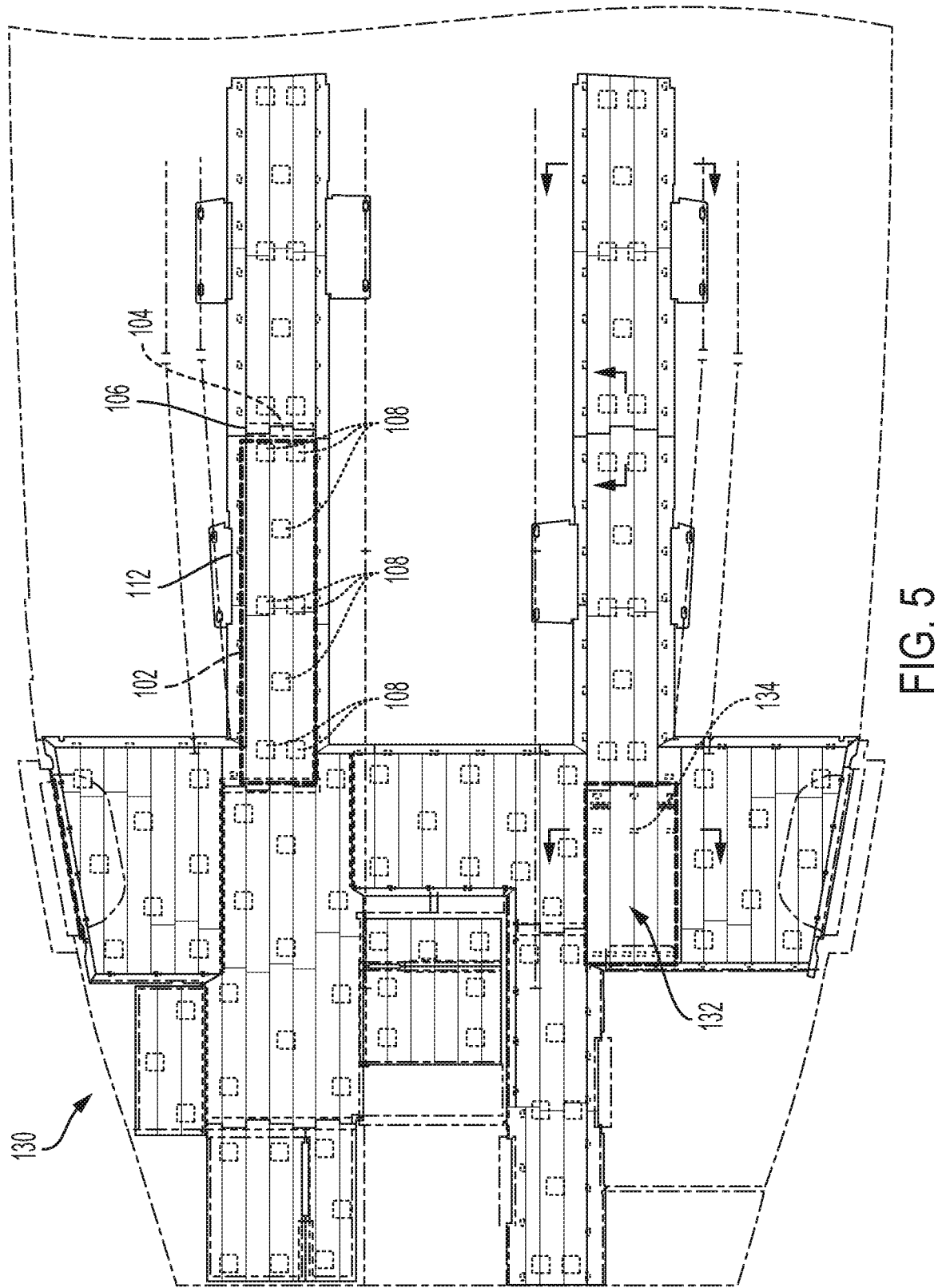
FIG. 5 illustrates a schematic layout of the floor covering system in a portion of an aircraft, according to an example implementation.

The floor covering system 100 includes a plurality of floor covering panels 102 positioned adjacent to each other creating interfaces 104 between respective floor covering panels of the plurality of floor covering panels 102. FIG. 1A only labels one interface 104, although the interfaces are present between the floor covering panels 102 that abut other floor covering panels 102. The floor covering system 100 also includes a plurality of joint panels 106 positioned underneath one or more of the interfaces 104. FIG. 1A only labels and illustrates one joint panel 106, although joint panels are included underneath many of the interfaces 104 (further examples are shown in FIG. 5). The plurality of floor covering panels 102 are rigidly coupled to at least one of the plurality of joint panels 106 to prevent relative motion between the plurality of floor covering panels 102. The floor covering system 100 also includes a plurality of attachment mounts 108 attached to a structure 110 (shown in FIG. 3) of the passenger vehicle. Each of the plurality of floor covering panels 102 is coupled to one or more of the plurality of attachment mounts 108, and the plurality of attachment mounts 108 enable lateral movement relative to the structure 110 of the passenger vehicle of the plurality of floor covering panels 102 together in a joint manner. FIG. 1A only labels and illustrates one attachment mount 108, although many attachment mounts are included underneath the floor covering panels 102 (further examples are shown in FIG. 5).

The floor covering system 100 also includes a plurality of edge panels 112 surrounding the plurality of floor covering panels 102. The plurality of edge panels 112 are coupled to the plurality of floor covering panels 102 through additional joint panels (shown in FIG. 6B). In FIG. 1A, not all edge panels are labeled for simplicity. Within examples, the plurality of edge panels 112 may surround a perimeter of all of the plurality of floor covering panels 102. In other examples, the plurality of edge panels 112 may surround only a portion of a perimeter of all of the plurality of floor covering panels 102, as shown in FIG. 1A, depending on a layout of the floor covering system 100. The plurality of edge panels 112, for example, form sort of a picture frame around the plurality of floor covering panels 102.

The plurality of floor covering panels 102 also include a plurality of planks 114 positioned in a staggered configuration on each of the plurality of floor covering panels 102. In FIG. 1B, one floor covering panel 102 is shown at the top right apart from the floor covering system 100 to illustrate the floor covering panel 102 with the plurality of planks 114. The plurality of floor covering panels 102 include boundaries that follow a hardwood floor pattern to provide discreet part interfaces, and on the plurality of floor covering panels 102, the plurality of planks 114 also include boundaries that follow a hardwood floor pattern. The plurality of floor covering panels 102 may be considered to be configured in a male or female format so that they interlock to one another.

Within examples, each floor covering panel 102 may be about eight feet long (or shorter) due to raw material size limitations and ability to load in place on a fully furnished airplane. A width of individual planks 114 is about six inches for a smooth installation of flooring panel edges. Using such sizes simulates a hardwood floor layout, and the planks 114 can be positioned with about an 0.09 inch wide seam between each plank. A length of the planks 114 may be about four feet long.

A specific arrangement and location of the plurality of floor covering panels 102 in the floor covering system 100 can vary based on a design of the passenger vehicle. In addition, a specific arrangement and location of the plurality of planks 114 on the plurality of the floor covering panels 102 can vary based on a design of the passenger vehicle.

The plurality of floor covering panels 102 comprise a composite panel material. In some examples, the plurality of floor covering panels 102 include multiple layers such as a rubberized sound dampening layer, a fiberglass foam core structural composite layer, an artwork substrate and an artwork film, and a durable polymer textured surface layer that can simulate a look of a hardwood floor. Thus, it is desirable for a top surface of the plurality of floor covering panels 102 to be a slip resistant surface to satisfy certain requirements, and beneath the slip resistance surface can be a decorative surface layer (e.g., a pattern resembling wood grain embossed thereon, texture of wood grain printed thereon, or any other aesthetic surface desired).

FIG. 2 is a side perspective view of a portion of the floor covering system 100, according to an example implementation. Each floor covering panel 102 includes an interlocking feature 113 that extends outward from a body 116 for slidably engaging a respective joint panel 106. Within examples, the interlocking feature 113 extends along an end of the body 116.

The interfaces 104 between the respective floor covering panels 102 include a gap. The gap is a space that can accommodate build tolerances, for example.

The plurality of joint panels 106 provide a common surface for the plurality of floor covering panels 102 to bond and seal to. The plurality of floor covering panels 102 can be bonded or sealed to the plurality of joint panels 106 using double-backed tape, for example, at the interlocking feature 113. By connecting the plurality of floor covering panels 102 to the plurality of joint panels 106, the plurality of floor covering panels 102 are connected to each other so as to any prevent relative motion between the plurality of floor covering panels 102.

FIG. 3 is a side view of a portion of the floor covering system 100, according to an example implementation. In FIG. 3, the floor covering panel 102 is shown attached on each side to a monument interface panel 118. Each monument interface panel 118 is connected to the structure 110 of the passenger vehicle using magnets and a P-seal to create a sealed joint 120. In this example, the structure 110 of the passenger vehicle is a structural floor, for example.

The plurality of attachment mounts 108 are rigidly attached to the structure 110 of the passenger vehicle. In FIG. 3, one attachment mount 108 is shown. The plurality of attachment mounts 108 can be rigidly attached to the structure 110 of the passenger vehicle using a bonding agent or tape. The plurality of floor covering panels 102 are then coupled to the attachment mounts 108 through a snap fit, or other mechanical fitting (e.g., screwed together, latches, etc.). The plurality of floor covering panels 102 are coupled to the monument interface panel 118 using tape as shown at interface 104, and a bead of sealant 122 can be applied in the gap of the interface 104.

FIG. 4 is a side view of another portion of the floor covering system 100, according to an example implementation. In FIG. 4, the attachment mount 108 is shown, which includes a first portion 124 rigidly attached to the structure 110 of the passenger vehicle, and a second portion 126 that couples to a respective floor covering panel 102. The second portion 126 has a lateral freedom of movement with respect to the first portion 124. As shown in FIG. 4, the second portion 126 is smaller than the first portion 124 and may slide laterally within a recess of the first portion 124. The second portion 126 may be mounted on a rail within the recess, which may include a spring, to enable the lateral movement. The second portion 126 may be coupled to the first portion 124 in other manners as well, such as through mechanical slots, snap fittings, spring-loaded screw mechanisms, or others.

In the floor covering system 100, the plurality of attachment mounts 108 prevent vertical movement of the plurality of floor covering panels 102. Since the plurality of floor covering panels 102 are coupled to the plurality of attachment mounts 108, no vertical movement is possible. However, the plurality of attachment mounts 108 enable lateral movement, but the plurality of attachment mounts 108 generally restrict lateral movement to less than about 0.2 inches, for example. The floor covering system 100 is restrained beyond further lateral movement and restrained against vertical movement when subjected to loads of nine times gravity in a forward direction and three times gravity in an upward direction, as defined by requirements applicable to retention of items of mass.

In further examples, the plurality of attachment mounts 108 enable up to about 0.2 inches of lateral movement of the plurality of floor covering panels 102 together in the joint manner. Thus, within examples, the relative motion between each of the plurality of floor covering panels 102 individually is restricted, but lateral movement of the plurality of floor covering panels 102 together in the joint manner is permissible. This is because the plurality of floor covering panels 102 are coupled together through the plurality of joint panels 106. In this manner, the plurality of floor covering panels 102 are effectively bonded together as a monolithic object that is dynamically attached to the structure 110 to accommodate relative motion between the monolithic object and the structure 110. The plurality of attachment mounts 108 act as lateral floating attachments for the monolithic object, for example.

Thus, within examples herein, the floor covering system 100 enables the plurality of floor covering panels 102 to be capable of floating (e.g., free to move laterally), in a joint manner, on the aircraft sub-floor (e.g., the structure 110 of the aircraft).

Dynamics and loads placed on the floor covering system 100 due to the aircraft being in flight require that the floor covering system 100 needs to withstand certain forces (e.g., about three times its own weight of force pulling up on it and about nine times its own weight of force pulling forward on it). The floor covering system 100 thus enables compliance with these mechanics of the dynamic load requirements of aircraft (e.g., flight loads and thermal contraction at altitude). By allowing the plurality of floor covering panels 102 to move together as an integral component with respect to the structure 110, the floor covering system 100 is allowed to float laterally to remove stress on the floor covering system 100 caused by mechanics of aircraft operation.

FIG. 5 illustrates a schematic layout of the floor covering system 100 in a portion of an aircraft 130, according to an example implementation. In FIG. 5, various areas of the aircraft 130 are shown including galley areas and seating areas. FIG. 5 illustrates a specific layout for a specific aircraft design in which the floor covering system 100 is positioned throughout the area.

In FIG. 5, only one floor covering panel 102 is labeled, although the floor covering system 100 in FIG. 5 is similar to that shown in FIG. 1A. As shown in FIG. 5, each of the plurality of floor covering panels 102 is coupled to multiple attachment mounts 108. For example, the floor covering panel 102 labeled in FIG. 5 is coupled to eight different attachment mounts 108. A number and a layout of the attachment mounts 108 per floor covering panel can vary, and may depend on a bond strength of the attachment mount to the structure 110. In addition, the number and layout can depend upon how much shear force each attachment mount 108 can handle (e.g., lifting force) as well as a weight of the floor covering panel 102.

In FIG. 5, one specific floor covering panel is not coupled to any attachment mounts, namely, an electronics bay hatch cover 132. Rather, magnets 134 are used to secure the electronics bay hatch cover 132 to the structure 110 to enable access during ground maintenance. The magnets 134 provide retention while still allowing some lateral displacement. In addition, the electronics bay hatch cover 132 is not coupled to any of the plurality of joint panels 106. Rather, a gasket is used to seal the electronics bay hatch cover 132 to the structure 110, for example.

Figure 6A:
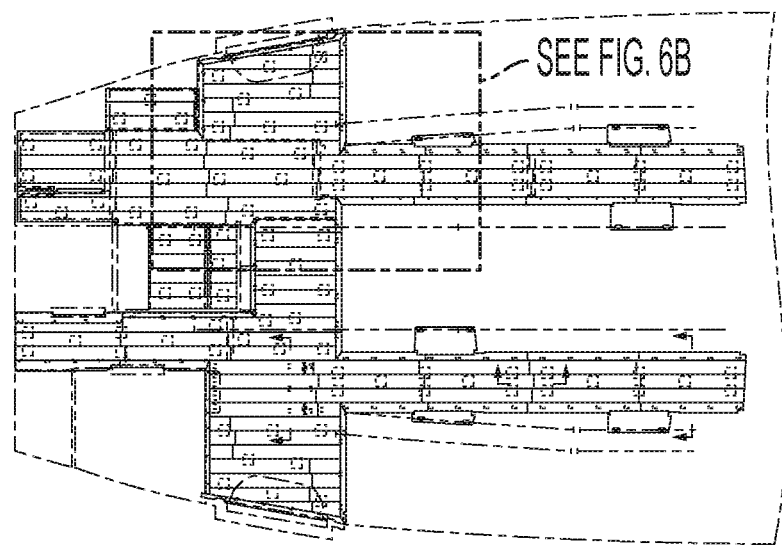
FIG. 6A is a view of a portion of the aircraft shown in FIG. 5, according to an example implementation.
Figure 6B:
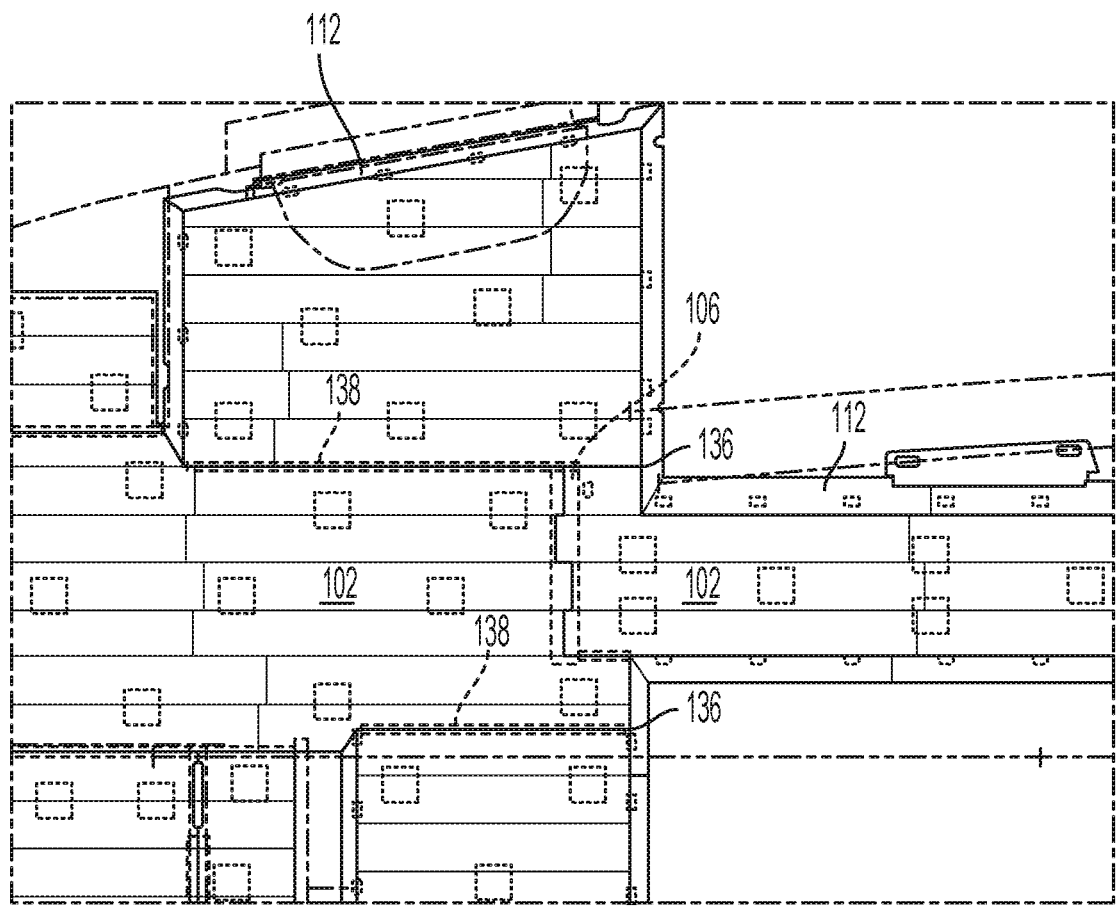
FIG. 6B is a magnified view of a portion of the aircraft shown in FIG. 6A, according to an example implementation.

FIG. 6A is a view of a portion of the aircraft 130 shown in FIG. 5, according to an example implementation. FIG. 6B is a magnified view of a portion of the aircraft shown in FIG. 6A, according to an example implementation. In FIG. 6B, the joint panel 106 is shown between ends of two adjacent floor covering panels 102. In addition, with the layout shown, the plurality of floor covering panels 102 are positioned adjacent to each other longitudinally creating side interfaces 136 between respective floor covering panels of the plurality of floor covering panels 102, and the floor covering system 100 includes a plurality of side joint panels 138 positioned underneath the side interfaces 136. Each of the plurality of floor covering panels 102 is rigidly coupled to at least one of the plurality of side joint panels 138 to prevent relative motion between the plurality of floor covering panels 102. In this example, the plurality of floor covering panels 102 are attached to all adjacent components, whether it is another floor covering panel or an edge panel 112. The interconnections among all panels create a monolithic structure where the components of the floor covering system 100 are prevented from moving relative to each other. Rather, the plurality of floor covering panels 102 may move together in a lateral motion as permitted by the plurality of attachment mounts 108.

FIGS. 7-14 illustrate example monument interfaces for the floor covering system 100, according to example implementations. In FIG. 7, a monument interface 140 is shown for a video control center (VCC) in an interior of the aircraft 130. At the monument interface 140, at least one of the plurality of planks 114 extends outward and overhangs the respective floor covering panel 102 forming an extension of the at least one of the plurality of planks 114, and the extension of the at least one of the plurality of planks 114 slides under the monument interface 140.

In FIG. 8, another example is shown of an extension of the at least one of the plurality of planks 114 sliding under the monument interface 140 at a monument entryway threshold in the interior of the aircraft 130.

In FIG. 9, the monument interface 140 includes a fitting, and an example is shown of the extension of the at least one of the plurality of planks 114 sliding under the monument interface 140.

In FIG. 10, the monument interface 140 includes a kickstrip, and an example is shown of the extension of the at least one of the plurality of planks 114 sliding under the monument interface 140.

In FIG. 11, the monument interface 140 includes a door mop sill, and in this example, at least one of the plurality of planks 114 extends outward and overhangs the respective floor covering panel 102 forming an extension of the at least one of the plurality of planks 114, and the extension of the at least one of the plurality of planks 114 overlaps the monument interface 140.

In FIG. 12, the monument interface 140 includes a door threshold, and an example is shown of the extension of the at least one of the plurality of planks 114 sliding under the monument interface 140.

In FIG. 13, the monument interface 140 includes a suite threshold, and an example is shown of the extension of the at least one of the plurality of planks 114 sliding under the monument interface 140.

In FIG. 14, the monument interface 140 includes a suite mop sill, and an example is shown of the extension of the at least one of the plurality of planks 114 overlapping the monument interface 140.

The examples shown in FIGS. 7-14 thus illustrate that the floor covering system 100 enables replacement of any floor covering panels with the monument interfaces 140 in place.

FIG. 15 shows a flowchart of an example of a method 200 for installing the floor covering system 100 in a passenger vehicle, according to an example implementation. Method 200 shown in FIG. 15 presents an example of a method that could be used with the floor covering system 100 shown in FIG. 1A, and/or within the aircraft 130 shown in FIG. 5, for example. In some instances, components and/or apparatuses may be configured to be used in the functions such that the components are actually configured and structured to enable such performance. In other examples, components and/or apparatuses may be arranged to be adapted to, capable of, or suited for performance of the functions. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes attaching a plurality of attachment mounts 108 to a structure 110 of the passenger vehicle. At block 204, the method 200 includes positioning a plurality of floor covering panels 102 adjacent to each other creating interfaces 104 between respective floor covering panels of the plurality of floor covering panels 102. At block 206, the method 200 includes rigidly coupling the plurality of floor covering panels 102 to at least one of a plurality of joint panels 106 positioned underneath the interfaces 104 to prevent relative motion between the plurality of floor covering panels 102. At block 208, the method 200 includes coupling each of the plurality of floor covering panels 102 to one or more of the plurality of attachment mounts 108, and the plurality of attachment mounts 108 enable lateral movement relative to the structure 110 of the passenger vehicle of the plurality of floor covering panels 102 together in a joint manner.

FIG. 16 shows a flowchart of an example method for use with the method 200, according to an example implementation. At block 210, the method 200 includes interlocking respective floor covering panels 102 with the at least one of the plurality of joint panels 106 via an interlocking feature 113 that extends outward from a body of the respective floor covering panels 102 for slidably engaging a respective joint panel 106.

FIG. 17 shows a flowchart of an example method for use with the method 200, according to an example implementation. At block 212, the method 200 includes coupling each of the plurality of floor covering panels 102 to multiple attachment mounts 108.

FIG. 18 shows a flowchart of an example method for use with the method 200, according to an example implementation. At block 214, the method 200 includes positioning a plurality of planks 114 in a staggered configuration on each of the plurality of floor covering panels 102.

Example processes illustrated in the flowcharts in FIGS. 15-18 may be performed or carried out manually by a system integrator, a third party, and/or an operator (e.g., a customer). The example processes illustrated in the flowcharts in FIGS. 15-18 enable a reduced installation time of flooring panels due to less installation materials required, increased reliability and repeatability of installation, and increased durability of the floor covering system 100. The example processes illustrated in the flowcharts in FIGS. 15-18 also enable improved aesthetics and customer satisfaction. Furthermore, the example processes illustrated in the flowcharts in FIGS. 15-18 enable replacement of individual floor covering panels as needed.

The installation of the floor covering system 100 in commercial passenger aircraft, such as in galley areas, enables customized aesthetic floor coverings in contrast to use of generic floor mats. In addition, examples described herein can avoid issues of buckling of floor coverings since the plurality floor covering panels 102 are allowed to move laterally as an integral unit, e.g., all of the plurality of floor covering panels 102 move together. Thus, individual floor covering panels of the floor covering system 100 described herein will not telegraph, buckle, or blister because the plurality of attachment mounts 108 will allow lateral motion to occur while ensuring that the plurality of floor covering panels 102 do not lift when an upward load is applied. Thus, the floor covering system 100 provides a floating floor system that is retained in place vertically, but allowed to move laterally in a restricted manner, and the floor covering system 100 accommodates technical challenges of motion of a sub-floor of the aircraft that happen during flight.

Within examples, preventing relative motion between the plurality of floor covering panels 102 also allows a softer non-adhesive sealant to be used in gaps, thereby allowing easy replacement of individual floor panels.

Furthermore, within examples, it is possible to replace a single floor panel if damaged or defective. For example, because the floor panels may move, a softer non-adhesive sealant can be used that is not permanent, thereby allowing easy replacement. The plurality of edge panels 112 are removable enabling any of the plurality of floor covering panels 102 to be replaced as well.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

By the term "substantially" and/or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), apparatus(es), and method(s) disclosed herein include a variety of components, features, and functionalities. It should be understood that the various examples of the system(s), apparatus(es), and method(s) disclosed herein may include any of the other components, features, and functionalities of any of the other examples of the system(s), apparatus(es), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A floor covering system in a passenger vehicle, the floor covering system comprising:
    a plurality of floor covering panels positioned adjacent to each other creating interfaces between respective floor covering panels of the plurality of floor covering panels;
    a plurality of joint panels positioned underneath one or more of the interfaces, wherein the plurality of floor covering panels are rigidly coupled to at least one of the plurality of joint panels to prevent relative motion between the plurality of floor covering panels; and
    a plurality of attachment mounts attached to a structure of the passenger vehicle, wherein each of the plurality of floor covering panels is coupled to one or more of the plurality of attachment mounts, wherein the plurality of attachment mounts enable lateral movement relative to the structure of the passenger vehicle of the plurality of floor covering panels together in a joint manner.

2. The floor covering system of claim 1, wherein the plurality of floor covering panels comprise a composite panel material.

3. The floor covering system of claim 1, wherein each floor covering panel comprises:
    an interlocking feature that extends outward from a body for slidably engaging a respective joint panel.

4. The floor covering system of claim 1, wherein the interfaces between the respective floor covering panels of the plurality of floor covering panels include a gap.

5. The floor covering system of claim 1, wherein the plurality of attachment mounts are rigidly attached to the structure of the passenger vehicle.

6. The floor covering system of claim 1, wherein the plurality of attachment mounts prevent vertical movement of the plurality of floor covering panels.

7. The floor covering system of claim 1, wherein each of the plurality of floor covering panels is coupled to multiple attachment mounts.

8. The floor covering system of claim 1, wherein the plurality of attachment mounts enable up to about 0.2 inches of lateral movement of the plurality of floor covering panels together in the joint manner.

9. The floor covering system of claim 1, wherein the plurality of attachment mounts include a first portion rigidly attached to the structure of the passenger vehicle, and a second portion that couples to a respective floor covering panel, wherein the second portion has a lateral freedom of movement with respect to the first portion.

10. The floor covering system of claim 1, wherein the plurality of floor covering panels are positioned adjacent to each other longitudinally creating side interfaces between respective floor covering panels of the plurality of floor covering panels, and the system further comprises:
    a plurality of side joint panels positioned underneath the side interfaces, wherein each of the plurality of floor covering panels is rigidly coupled to at least one of the plurality of side joint panels to prevent relative motion between the plurality of floor covering panels.

11. The floor covering system of claim 1, further comprising:
    a plurality of edge panels surrounding the plurality of floor covering panels, wherein the plurality of edge panels are coupled to the plurality of floor covering panels through additional joint panels.

12. The floor covering system of claim 1, further comprising:
a plurality of planks positioned in a staggered configuration on each of the plurality of floor covering panels.

13. The floor covering system of claim 12, wherein at a monument interface, at least one of the plurality of planks extends outward and overhangs the respective floor covering panel forming an extension of the at least one of the plurality of planks, and wherein the extension of the at least one of the plurality of planks slides under the monument interface.

14. The floor covering system of claim 12, wherein at a monument interface, at least one of the plurality of planks extends outward and overhangs the respective floor covering panel forming an extension of the at least one of the plurality of planks, and wherein the extension of the at least one of the plurality of planks overlaps the monument interface.

15. An aircraft comprising the floor covering system of claim 1.

16. A method for installing a floor covering system in a passenger vehicle, the method comprising:
attaching a plurality of attachment mounts to a structure of the passenger vehicle;
positioning a plurality of floor covering panels adjacent to each other creating interfaces between respective floor covering panels of the plurality of floor covering panels;
rigidly coupling the plurality of floor covering panels to at least one of a plurality of joint panels positioned underneath the interfaces to prevent relative motion between the plurality of floor covering panels; and
coupling each of the plurality of floor covering panels to one or more of the plurality of attachment mounts, wherein the plurality of attachment mounts enable lateral movement relative to the structure of the passenger vehicle of the plurality of floor covering panels together in a joint manner.

17. The method of claim 16, further comprising:
interlocking respective floor covering panels with the at least one of the plurality of joint panels via an interlocking feature that extends outward from a body of the respective floor covering panels for slidably engaging a respective joint panel.

18. The method of claim 16, wherein the plurality of attachment mounts prevent vertical movement of the plurality of floor covering panels and restrict lateral movement to less than 0.2 inches.

19. The method of claim 16, wherein coupling each of the plurality of floor covering panels to one or more of the plurality of attachment mounts comprises coupling each of the plurality of floor covering panels to multiple attachment mounts.

20. The method of claim 16, further comprising:
positioning a plurality of planks in a staggered configuration on each of the plurality of floor covering panels.

* * * * *